(12) United States Patent
Gauffin et al.

(10) Patent No.: US 10,207,189 B1
(45) Date of Patent: Feb. 19, 2019

(54) SYSTEM AND METHOD FOR DETERMINING TYPE OF PLAYER IN ONLINE GAME

(71) Applicant: Huuuge Global Ltd., Larnaca (CY)

(72) Inventors: Anton Gauffin, Berlin (DE); Wojciech Wronowski, Szczecin (PL)

(73) Assignee: Huuuge Global Ltd., Larnaca (CY)

( * ) Notice: Subject to any disclaimer, the term of this patent is extended or adjusted under 35 U.S.C. 154(b) by 0 days.

(21) Appl. No.: 15/953,793

(22) Filed: Apr. 16, 2018

(51) Int. Cl.
*A63F 13/75* (2014.01)
*A63F 13/537* (2014.01)
*A63F 13/35* (2014.01)

(52) U.S. Cl.
CPC .............. *A63F 13/75* (2014.09); *A63F 13/35* (2014.09); *A63F 13/537* (2014.09)

(58) Field of Classification Search
None
See application file for complete search history.

(56) References Cited

U.S. PATENT DOCUMENTS

| 9,517,402 | B1 * | 12/2016 | Vogel | G06F 21/316 |
| 2004/0180712 | A1 * | 9/2004 | Forman | A63F 13/12 463/17 |
| 2004/0242321 | A1 * | 12/2004 | Overton | G06F 21/128 463/29 |
| 2005/0288103 | A1 * | 12/2005 | Konuma | A63F 13/12 463/42 |
| 2007/0093284 | A1 * | 4/2007 | Ogilvie | G07F 17/32 463/13 |
| 2008/0004107 | A1 * | 1/2008 | Nguyen | G06Q 10/10 463/29 |
| 2009/0118016 | A1 * | 5/2009 | Ben-Artzi | G07F 17/32 463/42 |
| 2010/0222142 | A1 * | 9/2010 | Mori | A63F 13/12 463/29 |
| 2011/0256932 | A1 * | 10/2011 | Kim | A63F 13/12 463/42 |
| 2013/0288647 | A1 * | 10/2013 | Turgeman | H04W 12/06 455/411 |
| 2013/0324235 | A1 * | 12/2013 | Kim | A63F 13/12 463/29 |
| 2015/0209675 | A1 * | 7/2015 | Chang | A63F 13/75 463/29 |
| 2015/0224402 | A1 * | 8/2015 | Yang | A63F 13/75 463/29 |

* cited by examiner

*Primary Examiner* — Tramar Harper
(74) *Attorney, Agent, or Firm* — Ziegler IP Law Group, LLC (57) ABSTRACT

A system for determining a type of a player associated with an online game, wherein the system includes at least one player device having one or more sensing modules; a server arrangement communicably coupled with the at least one player device, wherein the server arrangement is configured to transmit a first set of information to the at least one player device; receive a second set of information from the at least one player device, wherein the second set of information comprises a game information and a sensor information; analyze the second set of information to calculate a reliability factor of the associated player; and determine the type of the associated player based on the calculated reliability factor.

17 Claims, 2 Drawing Sheets

SYSTEM AND METHOD FOR DETERMINING TYPE OF PLAYER IN ONLINE GAME

TECHNICAL FIELD

The present disclosure relates generally to online games and more specifically, to systems for determining type of players associated with online games. Furthermore, the present disclosure also relates to methods for determining the type of players associated with online games.

BACKGROUND

In recent time, online gaming has acquired an important place in an entertainment industry. Typically, a player performs one or more activities on a gaming apparatus to win an online game in a single player or a multiplayer mode. Further, a gaming establishment is configured to promote multiplayer mode wherein multiple players participate as team members of a team and perform activities in a collaborative manner to defeat an opponent team. Furthermore, the online game may comprise a skill-based game and a wager based game.

Generally, in the wager based game, the player places a wager on an outcome of the game. In such games the outcome of the game is uncertain. On the other hand, in the skill-based games, the player may determine the outcome of the game by using his/her physical or mental skills. The gaming establishment provides the benefits including monetary or financial gains to the player when he/she wins the game.

However, there exist certain limitations associated with providing aforementioned the benefits to the player associated with the online game. The online games very often involve fraudulence activities in various forms. For example, players may use an autonomous program (for example, such as bots) which can interact with the online game. Such autonomous programs are designed to behave like a player. Furthermore, such autonomous programs can apply perfect or nearly perfect strategies to determine the outcome of the online game and thereby attain the monetary or financial gains. To overcome the aforesaid limitation, most of the online games use computer programs or systems, such as captcha, intended to distinguish human from machine input. However, the bots generally bypass such computer programs using several techniques such as optical character recognition and machine learning.

Therefore, in light of the foregoing discussion, there exists a need to overcome the aforementioned drawbacks associated with determining the type of the player associated with the online game.

SUMMARY

The present disclosure seeks to provide a system for determining a type of a player associated with an online game.

The present disclosure also seeks to provide a method for determining a type of a player associated with an online game.

The present disclosure seeks to provide a solution to the existing problem of fraudulence activities associated with online games. An aim of the present disclosure is to provide a solution that overcomes at least partially the problems encountered in prior art, and provides safe, cost-efficient, easy to implement, and reliable system for determining the type of a player.

In one aspect, an embodiment of the present disclosure provides a system for determining a type of a player associated with an online game, characterized in that the system comprises:
  at least one player device having one or more sensing modules;
  a server arrangement communicably coupled with the at least one player device, wherein the server arrangement is configured to:
    (i) transmit a first set of information to the at least one player device;
    (ii) receive a second set of information from the at least one player device, wherein the second set of information comprises a game information and a sensor information;
    (iii) analyse the second set of information to calculate a reliability factor of the associated player; and
    (iv) determine the type of the associated player based on the calculated reliability factor.

In another aspect, an embodiment of the present disclosure provides a method for determining a type of a player associated with an online game, characterized in that the method comprises:
  (i) transmitting a first set of information from a server arrangement to a player device;
  (ii) receiving a second set of information from the player device, wherein the second set of information comprises a game information and a sensor information;
  (iii) analysing the second set of information to calculate a reliability factor of the associated player; and
  (iv) determining the type of the associated player based on the calculated reliability factor.

In another aspect, an embodiment of the present disclosure provides a system for determining a type of a player currently playing an online game, wherein the system comprises:
  at least one player device having one or more sensing modules;
  a server arrangement communicably coupled with the at least one player device, wherein the server arrangement is configured to:
    (i) transmit a first set of data elements to a player device of the at least one player devices on which the online game is active;
    (ii) receive a second set of data elements from the player device, wherein the second set of data elements comprises both a response to the first set of data elements and sensor data from the one or more sensing modules;
    (iii) analyse the second set of data elements and calculate a reliability factor of the second set of data elements based on the analysis;
    (iv) determine the type of player currently playing the online game on the player device based on the calculated reliability factor; and
    if it is determined that the type of player is a bot, the server arrangement is configured to at least partially disable the online game on the player device.

In another aspect the server arrangement is configured to at least partially disable the online game on the player device by preventing a transmission and reception of game related data to and from the player device.

In another aspect when it is determined that the type of associated player is an actual player, the server arrangement is configured to award credits to a game account of the associated player.

In another aspect the sensor data comprises one or more of location data of a location of the player device, an image captured by the player device, an orientation of the player device relative to a predetermined XYZ plane and a temperature measured by the player device.

In another aspect the response to the first set of data elements includes a detection of an interaction with a user interface of the player device by the server arrangement.

In another aspect the detected interaction is one or more of a touching or near touching of a screen of the user interface.

In another aspect rendering the first set of data elements comprises generating a pop-up window on the display and detecting the response comprises detecting selection of at least one object in the pop-up window.

In another aspect the one or more sensing modules comprises at least one or more of an accelerometer sensor, a temperature sensor, a location sensor, and an imaging sensor.

In another aspect the server arrangement is configured to perform steps (i) to (iii) iteratively to determine a plurality of reliability factors, wherein the plurality of reliability factors are processed to determine an overall reliability factor.

In another aspect the server arrangement is further configured to compare the calculated overall reliability factor with a predetermined value and determine the type of player based on the comparison.

In another aspect the online game is a multi-player game.

In another aspect the server arrangement is further configured to assign real-time time stamp data to data elements of the first set of data elements, data elements of the second set of data elements and the sensor data, wherein the reliability factor is calculated by processing the time stamp data, the first set of data elements, the second set of data elements and the sensor data.

In another aspect the first set of data elements comprises data of the online game that is rendered and currently active on the player device.

In another aspect the second set of data elements is generated based on detection of an interaction of the player with the at least one player device responsive to the data of the online game as it is rendered and currently active on the player device.

In another aspect, the disclosed embodiments provide a method for determining a type of a player associated with an online game rendered on a user device using a processor, the processor include non-transitory machine readable computer program instructions, wherein the method comprises execution of the non-transitory machine readable computer program instructions by the processor to:

transmit a first set of data elements to a player device of the at least one player devices on which the online game is active;

receive a second set of data elements from the player device, wherein the second set of data elements comprises both a response to the first set of data elements and sensor data from the one or more sensing modules;

analyze the second set of data elements and calculate a reliability factor of the second set of data elements;

determine the type of player playing the online game on the player device based on the calculated reliability factor; and if it is determined that the type of player is a bot, at least partially disable the online game on the player device.

In another aspect of the method when it is determined that the type of associated player is an actual player, the method comprises awarding credits to a game account of the associated player.

In another aspect of the method the first set of data elements comprises data of the online game that is rendered and currently active on the player device and the second set of data elements is generated based on detection of an interaction of the player with the at least one player device responsive to the data of the online game as it is rendered and currently active on the player device.

In another aspect the disclosed embodiments are directed to a system for determining a type of a player associated with an online game, wherein the system comprises:

at least one player device having one or more sensing modules;

a server arrangement communicably coupled with the at least one player device, wherein the server arrangement is configured to:

transmit a first request to a player device of the at least one player devices on which the online game is active;

render the first request on a display of the player device;

detect a response to the first request together with sensor data from the sensor modules of the player device;

analyse the response and the sensor data to calculate a reliability factor of a player associated with the online game and the player device on which the online game is active;

determine the type of the associated player based on the calculated reliability factor; and when it is determined that the type of associated player is a bot, at least partially disabling the online game on the player device by limiting a transmission and reception of game related data to and from the player device; or when it is determined that the type of associated player is an actual player, award credits to a game account of the associated player.

In another aspect of the system the sensor data comprises one or more of location data of a location of the player device, an image captured by the player device, an orientation of the player device and a temperature measured by the player device.

In another aspect of the system the response to the first request is a detected interaction with a user interface of the player device.

In another aspect of the system the detecting interaction is a touching of a screen of the user interface.

Embodiments of the present disclosure substantially eliminate or at least partially address the aforementioned problems in the prior art, and enables determination of the type of player in a safe, cost-efficient, easy to implement, and reliable system for determining the type of a player.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for determining a type of a player associated with an online game, characterized in that the system comprises:

at least one player device having one or more sensing modules;

a server arrangement communicably coupled with the at least one player device, wherein the server arrangement is configured to:

(i) transmit a first set of information to the at least one player device;

(ii) receive a second set of information from the at least one player device, wherein the second set of information comprises a game information and a sensor information;

(iii) analyse the second set of information to calculate a reliability factor of the associated player; and (iv) determine the type of the associated player based on the calculated reliability factor.

In another aspect, an embodiment of the present disclosure provides a method for determining a type of a player associated with an online game, characterized in that the method comprises:

(i) transmitting a first set of information from a server arrangement to a player device;

(ii) receiving a second set of information from the player device, wherein the second set of information comprises a game information and a sensor information;

(iii) analysing the second set of information to calculate a reliability factor of the associated player; and (iv) determining the type of the associated player based on the calculated reliability factor.

In a further aspect In another aspect, an embodiment of the present disclosure provides a system for determining a type of a player currently playing an online game, wherein the system comprises:

at least one player device having one or more sensing modules;

a server arrangement communicably coupled with the at least one player device, wherein the server arrangement is configured to:

(i) transmit a first set of data elements to a player device of the at least one player devices on which the online game is active;

(ii) receive a second set of data elements from the player device, wherein the second set of data elements comprises both a response to the first set of data elements and sensor data from the one or more sensing modules;

(iii) analyse the second set of data elements and calculate a reliability factor of the second set of data elements based on the analysis;

(iv) determine the type of player currently playing the online game on the player device based on the calculated reliability factor; and if it is determined that the type of player is a bot, the server arrangement is configured to at least partially disable the online game on the player device.

The aspects of the disclosed embodiments can advantageously determine when an online game is being played by a machine rather than a live person. This limits abuse of the system and games by ensuring that only persons are playing against each other and that machines, such as bots, are taking over the game and competition. This advantageously levels the playing field, particularly when it is difficult to visualize or necessarily know who the other opponent or opponents are in an online game.

In another aspect the server arrangement is configured to at least partially disable the online game on the player device by preventing a transmission and reception of game related data to and from the player device. The aspects of the disclosed embodiments advantageously limit the ability of a machine such as a bot to play an online game. This is particularly helpful when the other player(s) is a person.

In another aspect when it is determined that the type of associated player is an actual player, the server arrangement is configured to award credits to a game account of the associated player.

In another aspect the sensor data comprises one or more of location data of a location of the player device, an image captured by the player device, an orientation of the player device relative to a predetermined XYZ plane and a temperature measured by the player device. The sensor data can advantageously help determine who is playing an online game on a device-rather than a machine or bot.

In another aspect the response to the first set of data elements includes a detection of an interaction with a user interface of the player device by the server arrangement. Game information is presented on the screen of device during playing of the game. The physical interaction of the user with the device, an in particular, the interaction or response to game data or information presented on the user interface or display, during the playing of the game is used to determine that an actual person is playing rather than a machine or bot.

In another aspect the detected interaction is one or more of a touching or near touching of a screen of the user interface. When game data required interaction with an object on the display, a touch or near touch can be indicative of an actual person rather than a bot.

In another aspect rendering the first set of data elements comprises generating a pop-up window on the display and detecting the response comprises detecting selection of at least one object in the pop-up window. The aspects of the disclosed embodiments can provide a mechanism that requires user interaction that can be difficult to be overcome by a machine.

In another aspect the one or more sensing modules comprises at least one or more of an accelerometer sensor, a temperature sensor, a location sensor, and an imaging sensor.

In another aspect the server arrangement is configured to perform steps (i) to (iii) iteratively to determine a plurality of reliability factors, wherein the plurality of reliability factors are processed to determine an overall reliability factor.

In another aspect the server arrangement is further configured to compare the calculated overall reliability factor with a predetermined value and determine the type of player based on the comparison.

In another aspect the online game is a multi-player game.

In another aspect the server arrangement is further configured to assign real-time time stamp data to data elements of the first set of data elements, data elements of the second set of data elements and the sensor data, wherein the reliability factor is calculated by processing the time stamp data, the first set of data elements, the second set of data elements and the sensor data. The time stamp data can be used to determine when game information is presented and when a response to the game information is detected or received. For example, a user will typically need a minimum amount of time to formulate a response and interact with the device. However, a machine or bot can respond much more quickly. The aspects of the disclosed embodiments can look at the response times and determine if there is more or less of a likelihood that the response was generated by a machine or a person playing the game. The time stamp data can also correlate the timeliness of game data and a response, as well as when sensor data is detected relative to the game data and the responses to the game data. In one embodiment, this can ensure that the sensor data is substantially contemporaneous with one or more of the game data and the detected responses.

In another aspect the first set of data elements comprises data of the online game that is rendered and currently active on the player device.

In another aspect the second set of data elements is generated based on detection of an interaction of the player with the at least one player device responsive to the data of the online game as it is rendered and currently active on the player device.

In another aspect, the disclosed embodiments provide a method for determining a type of a player associated with an online game rendered on a user device using a processor, the processor include non-transitory machine readable computer program instructions, wherein the method comprises execution of the non-transitory machine readable computer program instructions by the processor to:

transmit a first set of data elements to a player device of the at least one player devices on which the online game is active;

receive a second set of data elements from the player device, wherein the second set of data elements comprises both a response to the first set of data elements and sensor data from the one or more sensing modules;

analyze the second set of data elements and calculate a reliability factor of the second set of data elements;

determine the type of player playing the online game on the player device based on the calculated reliability factor; and if it is determined that the type of player is a bot, at least partially disable the online game on the player device.

In another aspect of the method when it is determined that the type of associated player is an actual player, the method comprises awarding credits to a game account of the associated player.

In another aspect of the method the first set of data elements comprises data of the online game that is rendered and currently active on the player device and the second set of data elements is generated based on detection of an interaction of the player with the at least one player device responsive to the data of the online game as it is rendered and currently active on the player device.

In another aspect the disclosed embodiments are directed to a system for determining a type of a player associated with an online game, wherein the system comprises:

at least one player device having one or more sensing modules;

a server arrangement communicably coupled with the at least one player device, wherein the server arrangement is configured to:

transmit a first request to a player device of the at least one player devices on which the online game is active;

render the first request on a display of the player device;

detect a response to the first request together with sensor data from the sensor modules of the player device;

analyse the response and the sensor data to calculate a reliability factor of a player associated with the online game and the player device on which the online game is active;

determine the type of the associated player based on the calculated reliability factor; and when it is determined that the type of associated player is a bot, at least partially disabling the online game on the player device by limiting a transmission and reception of game related data to and from the player device; or when it is determined that the type of associated player is an actual player, award credits to a game account of the associated player.

In another aspect of the system the sensor data comprises one or more of location data of a location of the player device, an image captured by the player device, an orientation of the player device and a temperature measured by the player device.

In another aspect of the system the response to the first request is a detected interaction with a user interface of the player device.

In another aspect of the system the detecting interaction is a touching of a screen of the user interface.

The present disclosure seeks to provide a system and method for determining the type of a player associated with the online game. The present disclosure analyses the sensor information to calculate the reliability factor. Furthermore, the sensor information allows the system to determine whether the player device is used by a human (for example by determining if the player device is used by a hand) or bot.

Such analysis of the sensor information facilitates an accurate calculation of the reliability factor and thereby, an accurate determination of the type of the player. Beneficially, the present disclosure allows analysis of the sensor information of the player in an iterative or a predefined manner. Such detection of the sensor information of the player enable a safe, cost-efficient, easy to implement, and reliable system for determining the type of the player.

It will be appreciated that the online game relates to structured form of play that is either partially or primarily played over a communication network. The online game can be played by a single player or plurality of players. The examples of the online game may include, but are not limited to, wager based game such as a game of chance, a slot machine or any other betting game, a castle game, a strategy based game (e.g., a city building game) or another group game played such as a multiplayer game. The player uses the at least one player device to play the online game.

As mentioned previously, the system comprises at least one player device having one or more sensing modules. Throughout the present disclosure, the term "player device" used herein relates to an electronic computing device on which the player plays the online game. Examples of the at least one player device may include, but are not limited to, a personal computer, a hand-held computing device, a tablet, a game console, a laptop, a mobile computer, a wearable computer, a communication device such as a cell phone, and a personal digital assistant, a video slot machine, a video poker machine, a kiosk, a casino personal device, and the like. In an embodiment, the at least one player device may include a combination of a hardware and a firmware operable to receive the information. Optionally, the at least one player device includes a display unit for displaying the first set of information to the player. Moreover, the at least one player device includes a plurality of electronic components for example, such as a microprocessor, a graphics processor unit (GPU), a memory unit, a plurality of sensors, a battery, and a user interface.

Furthermore, the one or more sensing modules is operable to detect sensor information associated with the at least one player device. Optionally, the one or more sensing module comprises at least one of: an accelerometer sensor, a temperature sensor, a location sensor, an imaging sensor. In such a case, the sensor information comprises data pertaining to movement of the player device, temperature surrounding the player device, location of the player device and imagery information of the associated player.

As mentioned previously the system comprises server arrangement communicably coupled with the at least one player device. The term "server arrangement" used herein relates to a structure and/or module that include programmable and/or non-programmable components configured to receive, store, process and/or share the first set of information and the second set of information. In an example, the server arrangement may include components such as a memory unit, a processor, a network adapter and the like, to receive, store, process and/or share the first set of information. Optionally, the memory unit stores game related any data (for instance, number of users, winners, rewards awarded to the winner) in a database.

The server arrangement can include a single server or multiple servers communicably coupled with each other. The server arrangement is operable to execute online game related data. Optionally, the server arrangement is a game server or the server deployed in a cloud environment which is connected to the remote servers. Optionally, the server arrangement is implemented as two or more servers operating in a parallel and/or in a distributed architecture.

Furthermore, the server arrangement is communicably coupled with the at least one player device through the communication network. Optionally, the at least one player device is communicably coupled to the server arrangement via a wired network, a wireless network, or any combination thereof. Examples of the communication network between the at least one player device and the server arrangement include, but are not limited to, Local Area Networks (LANs), Wide Area Networks (WANs), radio network, Internet, radio networks, telecommunication networks. In an embodiment, the communication between the server arrangement and the at least one player device occurs over short-range networks and/or long-range networks.

As mentioned previously, the server arrangement is configured to transmit the first set of information from the server arrangement to the at least one player device. Throughout the present disclosure, the term "first set of information" used herein relates to data content associated with the online game. In such a case, the first set of information includes game related data content (for example, game instructions, levels, score, characters/objects, animations etc.). In one embodiment, the first set of information is in textual format. In another embodiment, the first set of information is provided in image format. In such an embodiment, the image format can be JPEG, JFIF, Exif, TIFF, GIF, BMP, PNG and the like. In another embodiment, the first set of information is provided in video format. In such an embodiment, the video format can be AVI (Audio Video Interleave), FLV (Flash Video Format), WMV (Windows Media Video), MOV (Apple QuickTime Movie), MP4 (Moving Pictures Expert Group 4) and the like. In another embodiment, the first set of information is provided in audio format. In such an embodiment, the audio format can be Waveform Audio File Format, Audio Interchange File Format, MPEG-1 Audio Layer 3, Advanced Audio Coding. In yet another embodiment, the first set of information is provided as a combination of textual, image, audio or video format. The first set of information includes information (for example, such as one or more questions, a set of rules, game levels and the like) with which the player interacts.

Upon receiving the first set of information, the at least one player device renders the first set of information on the user interface. Examples of the user interface include, but are not limited to, a touch sensitive input, a mouse, a keyboard, a joystick, a gesture controller, a display (for example, such as flat panel display, liquid crystal display, light-emitting diode and the like). The player interacts with the rendered first set of information according to the user interface of the at least one player device. For example, if the user interface of the at least one player device is a touch-sensitive surface, the player interacts with the online game by tactile input by using fingers or a stylus. In another example, if the user interface is a gesture-based, the player interacts with the online game through hovering the hand and/or other body parts. In yet another example, if the user interface is the display screen, the user may use a mouse or a touchpad to interact with the online game. Such interaction related information of the player with the online game is transmitted to the server arrangement.

As mentioned previously, the server arrangement is configured to receive the second set of information from the at least one player device, wherein the second set of information comprises the game information and the sensor information. Throughout the present disclosure, the term "second set of information" used herein relates to data content associated with the interaction of the player with the first set of information and the at least one player device. Specifically, the second set of information is generated based on the player interaction with the first set of information rendered over the user interface of the player device. In such a case, the second set of information includes response of the player and the associated player device while playing the online (for example, game instructions, levels, score, characters/ objects, and animations). In one embodiment, the second set of information is in textual format. In another embodiment, the second set of information is provided in image format. In another embodiment, the second set of information is provided in video format. In another embodiment, the second set of information is provided in audio format. In yet another embodiment, the second set of information is provided as a combination of textual, image, audio or video format. Optionally, the image format can be JPEG, JFIF, Exif, TIFF, GIF, BMP, PNG and the like. Alternatively, optionally, the video format can be AVI (Audio Video Interleave), FLV (Flash Video Format), WMV (Windows Media Video), MOV (Apple QuickTime Movie), MP4 (Moving Pictures Expert Group 4) and the like.

Throughout the present disclosure, the term "game information" used herein relates to data associated with interaction of the player with the first set of information rendered over the user interface of the at least one player device. In other words, the game information is the data content obtained during the player's interaction with the first set of information is. In an example, if the player is playing an online puzzle game, a question along with four options (first set of information) is received at the at least one player device. In such an example, the player may respond to the question by selecting one of the four options. In such a case, such selection of the option is considered as the game information. In another example, if the player interacts with an online car race game by controlling acceleration, deceleration, direction etc. of the car by interacting using the user interface. In such an example, such acceleration, deceleration, direction control of the car is considered as the game information. In another example, the player can enjoy playing the cards against another player in a multiplayer online game. In such an example, selection of a card, jumping to next game level, utilizing the game life etc. are considered as the game information. Other exemplary game information includes, but are not limited to, choosing a game level, selection of a background theme, managing audio settings, controlling of one or more graphical object and the like. Optionally, the game information further includes data related to time taken by the player for interacting with the first set of information rendered on the user interface of the at least one player device.

Furthermore, throughout the present disclosure, the term "sensor information" used herein relates to data associated with interaction of the player with the at least one player device to interact with the first set of information. The sensor information comprises information pertaining to movement of the player device, temperature surrounding the player device, location of the player device and imagery information of the associated player. In an embodiment, the sensor information is sensed by the one or more sensing module configured on the at least one player device. Optionally, the one or more sensing module comprises at least one of an accelerometer sensor, a temperature sensor, a location sensor, an imaging sensor, a gyroscope, a proximity sensor, and a fingerprint sensor.

The one or more sensing modules are configured to detect the information based on their design/configuration. In an example, the location sensor may detect the location of the at least one player device. In such an example, the location sensor may be a global positioning tracking unit for detecting the location of the at least one player device. In such a case, if the player is playing the online game while the traveling from one point to another, the global positioning tracking unit may continuously detect the location of the at least one player device during the travel.

In another example, an imaging sensor captures the imagery information of the associated player and/or the surrounding while playing the online game. In such an example, the imaging sensor may be a camera configured to capture the imagery information of the associated player. In such a case, the camera captures the video feed and/or the still images of the player while playing the online game. The captured video and/or the still images are transmitted to the server arrangement through the communication network. Optionally, the camera transmits the imagery information to the server arrangement when the player provides the game information by selecting an option using the user interface. Such imagery information is analyzed to detect the physical appearance of the player.

Furthermore, in another example, the accelerometer measures the orientation change and movement of the at least one player device. Such changes are performed by the player while playing the online game. For example, when the player interacts with the user interface to play the online game, there may be some movement in the at least one player device and thus the orientation of device may change. In such an example, the sensor information may be sent one second before and until 1 second after the player provides the game information by selecting an option using the user interface.

In yet another example, the temperature sensor is configured to detect the temperature of the surroundings of the at least one player device. In such an example, the temperature sensor detects the air temperature or ambient temperature of the surroundings of the at least one player device. In another example, the proximity sensor measures the proximity of the player with the associated at least one player device during the gameplay. In another example, the gyroscope may also be employed to detect movement of the associated at least one player device during the player holds the player device in hands and plays the online game.

As mentioned previously, the server arrangement is configured to analyse the second set of information to calculate the reliability factor of the associated player. The reliability factor is calculated by the server arrangement based on the analysis/processing of the game information, and the sensor information. Throughout the present disclosure, the term "reliability factor" used herein relates to a score assigned to the player using the at least one player device by analysing the second set of information. The server arrangement can calculate the reliability factor by using a set of algorithms. In such a case, such algorithms are stored within a memory unit of the server arrangement. Examples of such algorithms may include, but are not limited to, linear algorithms, logarithmic algorithms, fuzzy logic, artificial intelligence, machine learning mechanisms and the like.

Optionally, the reliability factor can be a floating number or an integer. In an embodiment, the server arrangement calculates the reliability factor in a fixed time intervals, for instance, in every 2 seconds, 10 seconds or 2 minutes. In an embodiment, the server arrangement calculates the reliability factor in real time i.e. upon continuous receiving of the game information, and the sensor information from the at least one player device.

As discussed previously, the server arrangement is configured to determine the type of the associated player based on the calculated reliability factor. The server arrangement processes one or more reliability factors to determine the type of the associated player. Throughout the present disclosure, the term "type of player" used herein relates to a category of the player playing the online game. In an embodiment, the type defines the player is a human or a bot. Throughout the present disclosure, the term "bot" used herein relates to non-human players. The bots are artificial intelligence enabled instructions to play the online game and earn the credit points by cheating.

Optionally, in this regard, the server arrangement is configured to compare the calculated reliability factor with a predetermined value. In such a case, the predetermined value may be stored in the server arrangement. Notably, if the calculated reliability factor is greater than the predetermined value, the player is determined to be human, whilst if the calculated reliability factor is less than the predetermined value, the player is determined to be the bot.

In an example, the imagery information is analysed to detect the physical appearance of the player. If the detected imagery information depicts a human appearance, a higher reliability factor may be provided to the player.

Optionally, the server arrangement is configured to perform steps (i) to (iii) are performed iteratively to determine plurality of reliability factors, wherein the plurality of reliability factors are processed to determine overall reliability factor. In such a case, the server arrangement transmits the first set of information iteratively, after receiving the second set of information from the at least one player device. In this regard, after each cycle of transmitting and receiving of the first set of information and the second set of information, the server arrangement calculates the reliable factor for each cycle. In an example, if the server arrangement completes three aforesaid cycles, the reliability factor is also calculated three times, i.e. after completion of each cycle. Thus, multiple reliability factors are obtained. Moreover, optionally, the processing module is operable to process the multiple reliability factors to determine the overall reliability factor. Optionally, the overall reliability factor is determined by calculating an average of the multiple reliability factors. Alternatively, optionally, the overall reliability factor is determined by calculating a weighted average of the multiple reliability factors. It will be appreciated that various other mathematical formulations can be employed to determine the overall reliability factor.

In the aforementioned example, the imagery information may be received by the server arrangement in an iterative manner. In such an example, different imagery information is analysed to determine whether the player of the player device is moving (such as having different expressions on face). Notably, if no movement is detected, the server arrangement may provide a lower overall reliability factor to the player.

In an embodiment, the overall reliability factor is calculated at the end of the gameplay. In another embodiment, the overall reliability factor is calculated at the end of each level of the multi-level game. In yet another embodiment, the overall reliability factor is calculated in a periodic manner i.e. in fixed time intervals.

It will be appreciated that if the reliability factor is calculated only once by the server arrangement, the calculated reliability factor is considered as the overall reliability factor.

Optionally, the server arrangement is further configured to compare the calculated overall reliability factor with the predetermined value. In an embodiment, the predetermined value is a floating number (for example such as 4.602, 3.426 and the like). In an alternate embodiment, the predetermined value is a positive integer.

The server arrangement compares the overall reliability factor with the predetermined value to determine the type of the player. In such a case, if the overall reliability factor is equal or greater than the predetermined value, the type of player is the human. Alternatively, if the overall reliability factor is less than the predetermined value, the player type is the bot.

Optionally, the server arrangement is further configured to assign time stamp information to each of the game information and the sensor information, wherein the reliability factor is calculated by processing the time stamp information, game information, and the sensor information. In such a case, the at least one player device includes a time sensing means. The time sensing means is configured to assign the time stamp information to each of the game information and the sensor information. The time sensing means assigns time stamp information to the game information and the sensor information from the starting of the gameplay. Notably, the at least one player device transmits the time stamp information, game information, and the sensor information to the server arrangement. The server arrangement receives the transmitted time stamp information, the game information, and the sensor information. In an embodiment, the server arrangement receives the time stamp information, game information, and the sensor information from the at least one player device in a fixed time intervals, for instance, in every 5 milliseconds or in 10 seconds. In an alternate embodiment, the server arrangement receives the time stamp information, game information, and the sensor information from the at least one player device in real time for example, when the player interacts with the first set of information. The server arrangement is further configured to match the time stamps of the game information and the sensor information. In such a case, if the time stamps of both the game information and the sensor information are same, the server arrangement may determine that the player is a human and thus provides a higher reliability factor of the associated player. However, if the time stamps of both the game information and the sensor information are different, the server arrangement may determine that the player is the bot and thus provide a low reliability factor of the associated player. More optionally, the server arrangement processes the time stamp information to compute a reaction time of the player. Additionally, optionally, the server arrangement may process the time stamp information only when the player is continuously winning the online game. Alternatively, optionally, the server arrangement may process the time stamp information in a predefined manner.

In an example, the time stamp information for the game information (for example selection of an answer to a puzzle) is at XX instant and the time stamp information for the sensor information (for example, movement of the player device by touching the player device for selection of the answer) is also at XX instant. In such a case, since the time stamp information is same for both, the game information and the sensor information, the server arrangement assigns the higher reliability factor to the associated player. In another example, the time stamp information for the game information (for example selection of an answer to a puzzle) is at XX instant and the time stamp information for the sensor information (for example, movement of the player device by touching the player device for selection of the answer) is at YY instant. In such a case, since the time stamp information is different for both, the game information and the sensor information, the server arrangement assigns the lower reliability factor to the associated player.

Optionally, the sensing module is also operable to detect a pattern in the usage of the user interface. In such a case, if a similar pattern is detected for a longer duration of time, the server arrangement may determine that the type of the player is the bot.

In an embodiment, upon determination, if the player is the human, the player is awarded the credit points/price/cash back in the player's account. An account related data is maintained in the database. The earned credit points can be redeemed for a transaction performed at the point of sale or online shopping. Alternatively, the credit points can be redeemed to play games. All the transaction information is updated in the player account in real time.

In another embodiment, upon determination, if the player is the bot, cheating countermeasures are involved to bar the bots to participate in games. In an embodiment, the bot is disqualified as the player, thereby cannot earn the credit points. Optionally, the bot device is barred to receive and/or transmit game related data with the server arrangement. The bot will be blocked immediately at the current stage of the online game or at the end of the online game or at the end of the particular game level. Optionally, the at least one player device which cheated as the bot can be permanently blocked for all the future game related activities. This provides the technical advantage of ensuring consistent types of players across all players of an online game in a time efficient manner. Otherwise, a player verification process would be more time consuming as well as resource consuming if login and other data would need to be stored. Also, the aspects of the disclosed embodiments allow for the player type to be determined while the game is ongoing and being played. This can prevent a substitution of a live player with a machine at a later point in the game. To require such verification while the game is ongoing would be time consuming and disruptive. Thus, the aspects of the disclosed embodiments advantageously provide a much more efficient process.

DETAILED DESCRIPTION OF THE DRAWINGS

Figure 1:
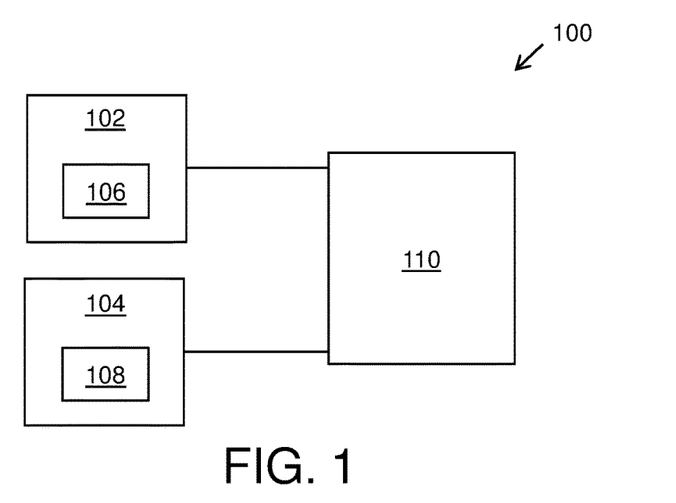
FIG. 1 illustrates a block diagram of a system for determining a type of a player associated with an online game, in accordance with an embodiment of the present disclosure.

Referring to FIG. 1, there is shown a block diagram of system 100 for determining a type of a player associated with an online game, in accordance with an embodiment of the present disclosure. As shown, the system comprises at least one player device (depicted as player devices 102 and 104) having one or more sensing modules (depicted as sensing modules 106 and 108). The system 100 comprises a server arrangement 110 communicably coupled with the at least one player device 102-104. The server arrangement 110 is configured to transmit a first set of information to the at least one player device 102-104, receive a second set of information from the at least one player device 102-104, wherein the second set of information comprises a game information and a sensor information, analyse the second set of information to calculate a reliability factor of the associated player and determine the type of the associated player based on the calculated reliability factor.

Figure 2:
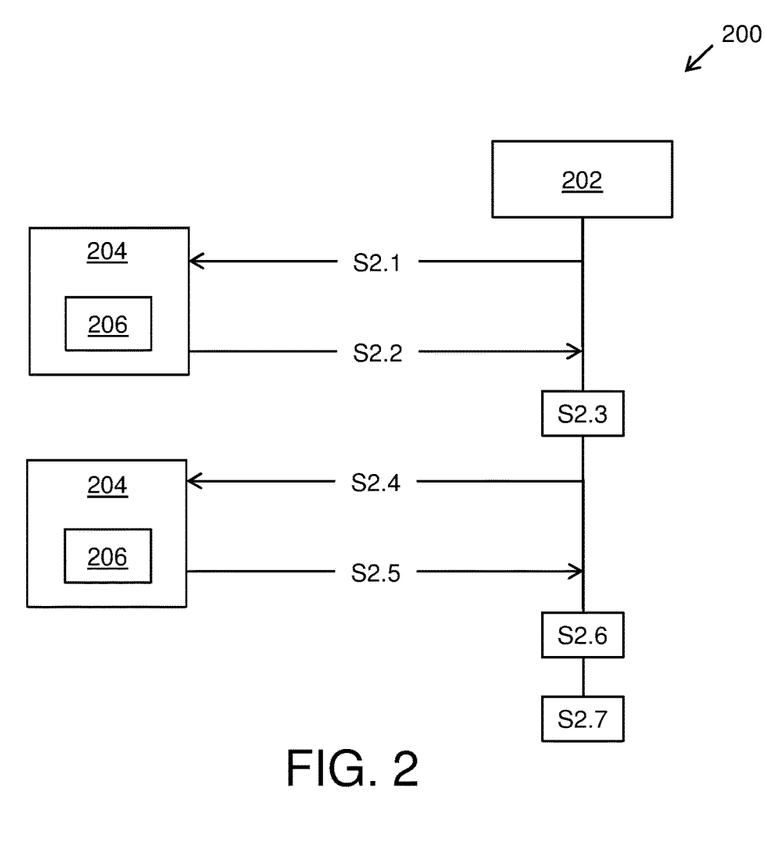
FIG. 2 is an exemplary sequence diagram of implementation of a system (for example, such as the system of FIG. 1), in accordance with an embodiment of the present disclosure.

Referring to FIG. 2, illustrated is a schematic exemplary sequence diagram of implementation of a system 200 (for example, such as the system 100 of FIG. 1), in accordance with an embodiment of the present disclosure. At a step S2.1, a server arrangement 202 transmits a first set of information to the at least one player device, depicted as player device 204. As shown, the at least one player device 204 includes one or more sensing modules, depicted as sensing module 206. At a step S2.2, the server arrangement 202 receives a second set of information from the at least one player device 204, wherein the second set of information comprises a game information and a sensor information. At a step S2.3, the server arrangement 202 analyses the second set of information to calculate a reliability factor of an associated player. At a step S2.4, the server arrangement 202 transmits the first set of information to the at least one player device 204 again. It will be appreciated that the first set of information transmitted at the step S2.4 is different from the first set of information transmitted at the step S2.1. At a step S2.5, the server arrangement 202 receives a second set of information from the at least one player device 204. At a step S2.6, the server arrangement 202 analyses the second set of information to calculate a reliability factor of the associated player. At a step S2.7, the reliability factors, calculated at steps S2.3, S2.6 are processed to determine overall reliability factor, wherein the server arrangement 202 is further configured to compare the calculated overall reliability factor with a predetermined value to determine the type of the associated player based on the calculated reliability factor.

Figure 3:
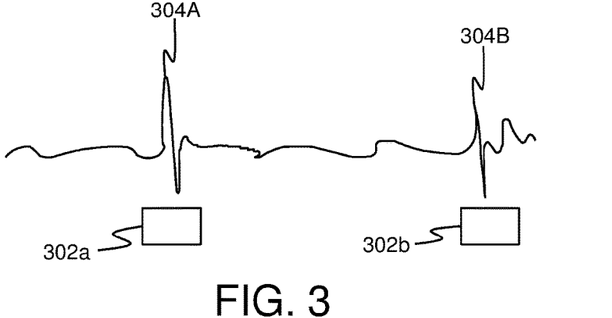
FIG. 3 is a graphical representation of sensor data game information and the sensor information in accordance with an embodiment of the present disclosure.

Referring to FIG. 3, illustrated is a graphical representation of game information 302a-302b and sensor information 304a-304b, in accordance with an embodiment of the present disclosure. The game information 302a-302b and the sensor information 304a-304b are graphically represented with respect to time. The game information 302a-302b and the sensor information 304a-304b are time stamped. As shown, the sensor information 304a and the game information 302a are occurring at a same time and the sensor information 304b and the game information 302b are occurring at a same time. Such analysis of the game information 302a-302b and the sensor information 304a-304b allows the system (for example, such as system 100 of FIG. 1) to determine a reliability factor of the associated player.

Figure 4:
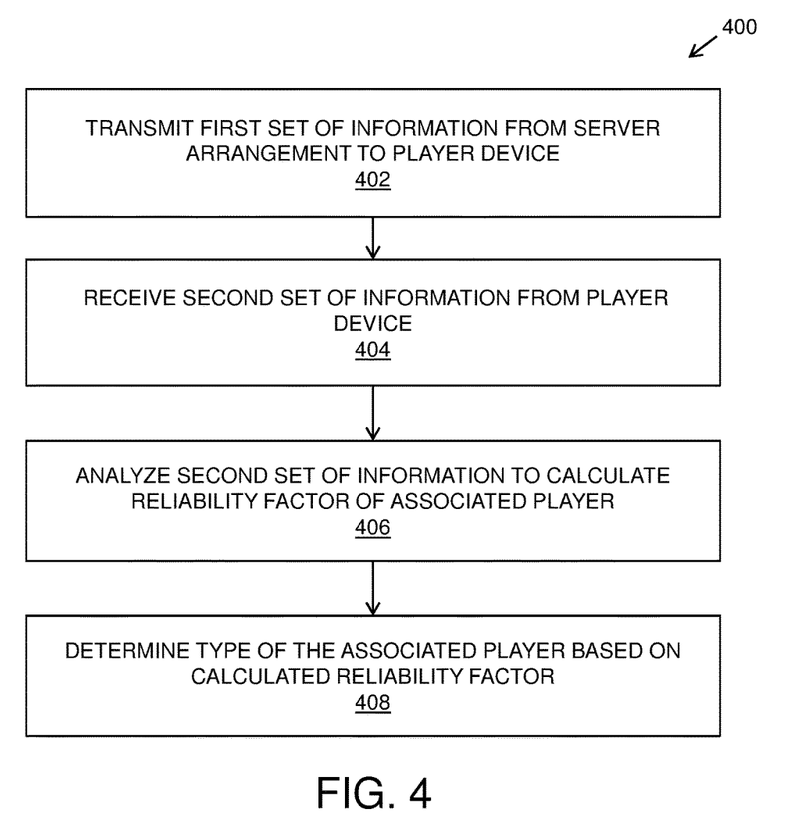
FIG. 4 is an illustration of steps of a method for determining a type of a player associated with an online game, in accordance with an embodiment of the present disclosure.

Referring to FIG. 4, illustrated are steps of a method 400 for determining a type of a player associated with an online game, in accordance with an embodiment of the present disclosure. At a step 402, a first set of information is transmitted from a server arrangement to a player device. At a step 404, a second set of information is received from the player device, wherein the second set of information comprises a game information and a sensor information. At a step 406, the second set of information is analysed to calculate a reliability factor of the associated player. At a step 408, the type of the associated player is determined based on the calculated reliability factor.

The steps 402 to 408 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for determining a type of a player currently playing an online game, wherein the system comprises:

at least one player device having one or more sensing modules;

a server arrangement communicably coupled with the at least one player device, wherein the server arrangement is configured to:
  (i) transmit a first set of data elements to a player device of the at least one player devices on which the online game is active;
  (ii) receive a second set of data elements from the player device, wherein the second set of data elements comprises both a response to the first set of data elements and sensor data from the one or more sensing modules;
  (iii) analyse the second set of data elements and calculate a reliability factor of the second set of data elements based on the analysis, wherein the server arrangement is further configured to assign real-time time stamp data to data elements of the first set of data elements, data elements of the second set of data elements and the sensor data, wherein the reliability factor is calculated by processing the time stamp data, the first set of data elements, the second set of data elements and the sensor data;
  (iv) determine the type of player currently playing the online game on the player device based on the calculated reliability factor; and
  if it is determined that the type of player is a bot, the server arrangement is configured to at least partially disable the online game on the player device.

2. The system according to claim 1, wherein the server arrangement is configured to at least partially disable the online game on the player device by preventing a transmission and reception of game related data to and from the player device.

3. The system according to claim 1, wherein when it is determined that the type of associated player is an actual player, the server arrangement is configured to award credits to a game account of the associated player.

4. The system according to claim 1, wherein the sensor data comprises one or more of location data of a location of the player device, an image captured by the player device, an orientation of the player device relative to a predetermined XYZ plane and a temperature measured by the player device.

5. The system according to claim 1, wherein the response to the first set of data elements includes a detection of an interaction with a user interface of the player device by the server arrangement.

6. The system according to claim 5 wherein the detected interaction is one or more of a touching or near touching of a screen of the user interface.

7. The system according to claim 1 wherein rendering the first set of data elements comprises generating a pop-up window on a display and detecting the response comprises detecting selection of at least one object in the pop-up window.

8. The system according to claim 1 wherein the one or more sensing modules comprises at least one or more of an accelerometer sensor, a temperature sensor, a location sensor, and an imaging sensor.

9. The system according to claim 1, wherein the server arrangement is configured to perform steps (i) to (iii) iteratively to determine a plurality of reliability factors, wherein the plurality of reliability factors are processed to calculate an overall reliability factor.

10. The system according to claim 9, wherein the server arrangement is further configured to compare the calculated overall reliability factor with a predetermined value and determine the type of player based on the comparison.

11. The system according to claim 1, wherein the online game is a multi-player game.

12. The system according to claim 1, wherein that the first set of data elements comprises data of the online game that is rendered and currently active on the player device.

13. The system according to claim 12, wherein the second set of data elements is generated based on detection of an interaction of the player with the at least one player device responsive to the data of the online game as it is rendered and currently active on the player device.

14. A method for determining a type of a player associated with an online game rendered on a user device using a processor, the processor include non-transitory machine readable computer program instructions, wherein the method comprises execution of the non-transitory machine readable computer program instructions by the processor to:

transmit a first set of data elements to a player device of the at least one player devices on which the online game is active;

receive a second set of data elements from the player device, wherein the second set of data elements comprises both a response to the first set of data elements and sensor data from the one or more sensing modules;

analyze the second set of data elements and calculate a reliability factor of the second set of data elements;

determine the type of player playing the online game on the player device based on the calculated reliability factor; and if it is determined that the type of player is a bot, at least partially disable the online game on the player device; or if it is determined that the type of associated player is an actual player, the method comprises awarding credits to a game account of the associated player; and wherein the first set of data elements comprises data of the online game that is rendered and currently active on the player device and the second set of data elements is generated based on detection of an interaction of the player with the at least one player device responsive to the data of the online game as it is rendered and currently active on the player device.

15. A system for determining a type of a player associated with an online game, wherein the system comprises:

at least one player device having one or more sensing modules;

a server arrangement communicably coupled with the at least one player device, wherein the server arrangement is configured to:

transmit a first set of data elements comprising first request to a player device of the at least one player devices on which the online game is active;

render the first request on a display of the player device;

detect a second set of data elements comprising response to the first request together with sensor data from the sensor modules of the player device;

analyse the response and the sensor data to calculate a reliability factor of a player associated with the online game and the player device on which the online game is active;

determine the type of the associated player based on the calculated reliability factor; and when it is determined that the type of associated player is a bot, at least partially disabling the online game on the player device by limiting a transmission and reception of game related data to and from the player device; or when it is determined that the type of associated player is an actual player, award credits to a game account of the associated player; and wherein the first set of data elements comprises data of the online game that is rendered and currently active on the player device and the second set of data elements is generated based on detection of an interaction of the player with the at least one player device responsive to the data of the online game as it is rendered and currently active on the player device.

16. The system according to claim 15, wherein the sensor data comprises one or more of location data of a location of the player device, an image captured by the player device, an orientation of the player device and a temperature measured by the player device.

17. The system according to claim 15, wherein the response to the first request is a detected interaction with a user interface of the player device.

* * * * *